Figure 1:
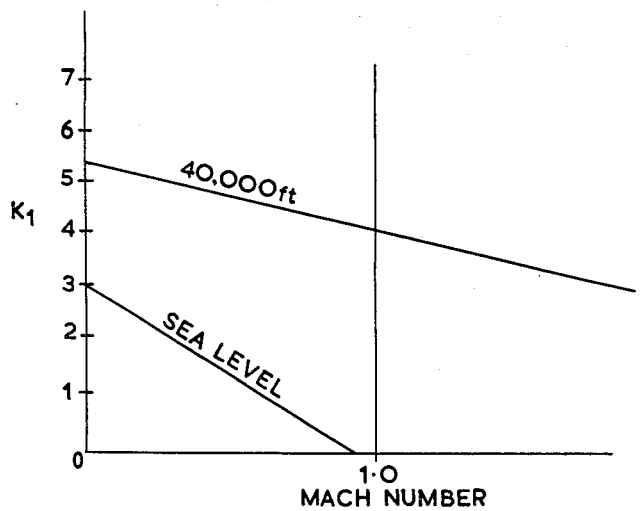

Oct. 24, 1961   J. C. GIBSON   3,005,606
AIRCRAFT MANOEUVRE BOOST CONTROL SYSTEMS
Filed Nov. 16, 1959   3 Sheets-Sheet 1

Inventor:
John Campbell Gibson
By
Stevens, Davis, Miller + Mosher
Attorneys

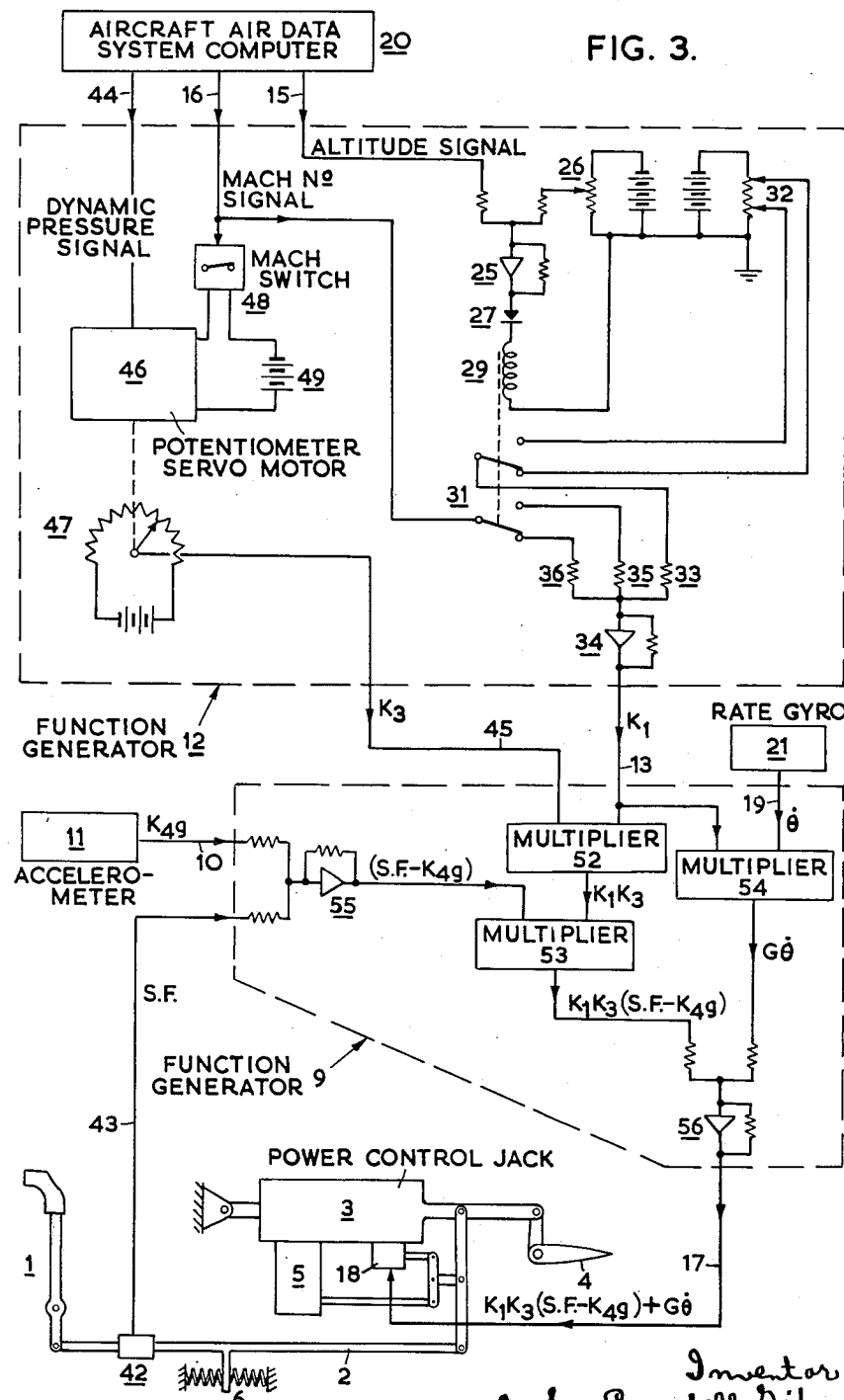

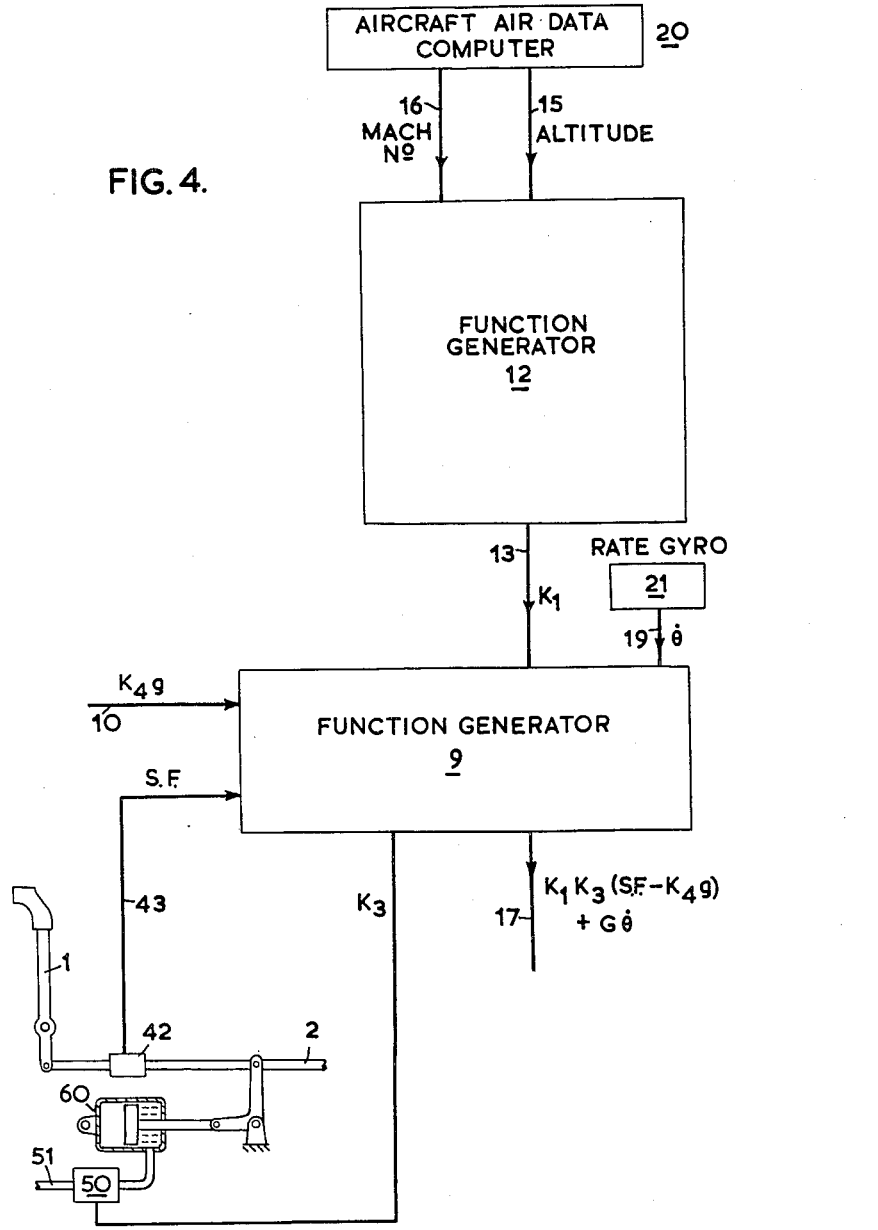

United States Patent Office 3,005,606
Patented Oct. 24, 1961

3,005,606
AIRCRAFT MANOEUVRE BOOST CONTROL SYSTEMS
John Campbell Gibson, Lytham St. Annes, England, assignor to The English Electric Company Limited, London, England, a British company
Filed Nov. 16, 1959, Ser. No. 853,322
Claims priority, application Great Britain Sept. 17, 1959
5 Claims. (Cl. 244—83)

This invention relates to manoeuvre boost control systems for improving the longitudinal handling characteristics of high speed aircraft.

Implicit in the design of a long range, high speed aircraft are small frontal area, thin wings, and large fuel capacity. To satisfy these requirements a very long, thin fuselage containing crew, load, fuel and equipment is almost inevitable. Associated with such a fuselage will be a considerable inertia in pitch which can cause the aircraft to have sluggish longitudinal characteristics. Such characteristics are most undesirable, especially if the aircraft has to be flown very precisely; for example when used as a weapon platform.

The system according to the invention is intended to improve the initial pitch response of an aircraft and yet leave the steady state relationship between tailplane angle and associated manoeuvre unchanged. If desired the system may be designed to be complementary to the normal control circuit, so that it may be selected "in" or "out" and failure of it will not jeopardise the safety of the aircraft. In use, the only manifestation of the system to the pilot will be improved pitch handling characteristics, with unchanged stick force per "g." The significance of the expression "g" as used in this specification is acceleration in the pitching plane occurring in response to the pitch control or to vertical gusts.

According to the invention an aircraft manoeuvre boost control system for improving the rate of response in pitch of the aircraft to movement of the pilot's control comprises, in combination with tailplane control means including a pilot's control stick, a tailplane power actuator, and a mechanical linkage connecting the control stick and the actuator, an accelerometer positioned in the aircraft to measure acceleration of the aircraft in pitch and to provide an acceleration-responsive electrical signal, electrical transducer means connected to said tailplane control means and operative to provide a signal which is a measure of the force applied to the pilot's control stick by the pilot, electrical computer means connected to respond to the acceleration-responsive signal and to said signal which is a measure of the stick force and operative to produce a boost signal which increases with increase in the signal which is a measure of stick force and decreases with increase of said acceleration-responsive signal, and a connection between said electrical computer means and said power actuator to supply the boost signal to the actuator to supplement the pilot control transmitted along said mechanical control linkage.

According to a feature of the invention said electrical computer means is operative to produce a boost signal proportional to the difference between the signal which is a measure of stick force and the acceleration-responsive signal, whereby the boost signal is reduced to zero under steady state conditions.

According to another feature of the invention, there is provided an aircraft air data system and the electrical computer means is also connected to respond to electrical altitude and Mach number signals supplied by the air data system and is operative to decrease the boost signal with increase of Mach number.

According to another feature of the invention, the air data system further provides an aircraft dynamic pressure signal and said electrical computer means are further operative to produce a boost signal which varies with variation of the product of the difference between the signal which is a measure of stick force and the acceleration-responsive signal and the product of two gain factors one of which decreases as the Mach number signal increases and the other of which is at least over a range of Mach numbers a linearly increasing function of the dynamic pressure signal.

According to another preferred feature of the invention the manoeuvre boost control system includes an artificial feel system including a hydraulic pressure device to provide the control stick stiffness, a pressure-sensitive electrical transducer connected to said hydraulic pressure device to respond to the pressure therein and to provide a signal proportional to the inverse of the hydraulic pressure, and wherein said electrical computer means is connected to said pressure-sensitive transducer and is operative to produce a boost signal which is proportional to the product of the difference between the signal which is a measure of stick force and the acceleration-responsive signal and the product of two gain factors one of which decreases as the Mach number signal increases and the other of which is proportional to the signal derived from the pressure-sensitive transducer.

Figure 2:
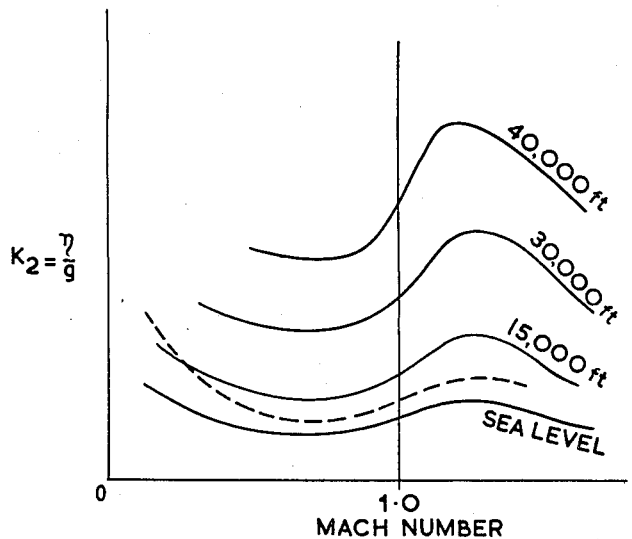

The invention will now be described with reference to the accompanying drawings in which:

FIGS. 1 and 2 show characteristics applicable to the pitch response of an aircraft, and FIGS. 3 and 4 show schematically aircraft manoeuvre boost control systems respectively embodying different preferred features of the invention.

Consider an aircraft manoeuvre boost control system for which the applied tailplane angle (to be denoted $\eta$) is given by:

$$\eta = \eta_P + \eta_B$$

where $$\eta_B = K_1(\eta_P - K_2 g)$$

here $\eta_P$ is the tailplane angle applied by the pilot's control stick in the absence of a boost control, $\eta_B$ is the additional tailplane angle applied by the boost control, $K_1$ is the gain of the boost control system, and $K_2$ is the valve of $\eta/g$ under steady state conditions.

In such a system the parameters $K_1$ and $K_2$ are preferably controlled in accordance with the flight conditions of the aircraft. It is found, for example, that a value of $K_1$ suited to the pilot's feel of control of a typical high speed aircraft is about 3 when the aircraft is flying at a fairly low speed. At higher speeds the aircraft becomes naturally more responsive to the pilot's control and the gain of the manoeuvre boost control can be reduced with advantage. The manoeuvre boost control system therefore preferably includes means for reducing $K_1$ with increasing speed and further, where required, to render this dependence of $K_1$ upon speed also dependent upon the altitude of the aircraft to offset the weakening of the natural response of the aircraft in more rarified atmospheres.

This is illustrated in FIG. 1 where typical values of $K_1$ suitable for use in a pitch handling manoeuvre boost control system are shown as a function of Mach number at two different altitudes.

The full line curves of FIG. 2 show relationships between the steady state value of the quantity $\eta/g$ and Mach number for different altitudes in a typical high speed aircraft. $K_2$ is therefore a controlled quantity varied in accordance with relationships such as those in this figure. In practice it is found that the relationships depend upon the position of the centre of gravity of the aircraft. For example, if the centre of gravity is well forward in the aircraft the relationship applicable at sea level is displaced to the position indicated by the broken line curve. It is desirable for the value of $\eta_B$ to be zero under steady state flight conditions and it is difficult to render $K_2$ dependent upon the actual position of the centre of gravity. Accordingly, it has been proposed in co-pending application No. 853,321, Arthur George Barnes, Ian Albert Moore Hall and Richard Keith Thomasson to utilize a value of $K_2$ which follows a compromise relationship lying midway between the relationships applicable to two estimated limits of the centre of gravity position. This means that if the centre of gravity is at a position corresponding to this midway relationship $\eta_B$ is zero under steady state conditions. However, if the centre of gravity is forward of this position a small amount of boost will be provided in the steady state. The effect of this will be to provide a slightly more sensitive response to the pilot control because the pilot's control stick force for a given manoeuvre increases as the centre of gravity moves forward and the effect of the boost will be to reduce this increase and thereby render the feel of the control more consistent even though the centre of gravity may vary with different load and fuel distribution.

The method of control just described suffers from disadvantages particularly with regard to the derivation of the $\eta_P$ quantity for application in a manoeuvre boost control system utilising an electrically controlled autostabiliser actuator and with regard to the difficulties occasioned by the effect of altitude on the preferred value of $K_2$.

These disadvantages are overcome by the system in accordance with the present invention. In this system, the pilot input control quantity is the stick force S.F. and is used with other inputs to be defined to compute $\eta_B$ so that $$\eta_B = K_1 K_3 (S.F. - K_4 g)$$

where $K_1$ = system gain
$K_3$ = tailplane angle per lb. stick force
$K_4$ = stick force per g in lbs. stick force.

The stick force applied by the pilot to the aircraft control stick is measured by an electrical force transducer, such as a type of dynamometer frequently used in flight testing, mounted in the control circuit between the stick and the feel unit. Trim zeroing may be obtained automatically, and even with a non-linear control circuit the feel system can be arranged to give reasonably constant, linear stick force per g at a given centre of gravity position. $K_4$ can thus be a constant value: where stick force per g varies due to feel system characteristics, the variation will be minimised by the effective change of stick gearing due to the $K_4 g$ term.

Generation of $K_3$ is simpler than the generation of $K_2$: the required function is the inverse of the "stick stiffness" or stick force per degree of tailplane angle. In a typical feel system this is a linear function of dynamic pressure, i.e. $(H-p)$ where H is the pilot total head and $p$ is static pressure, up to a preset Mach number. Also, at Mach numbers above the preset value (e.g. Mach number 0.9) stick stiffness may be regarded as a function of height only, or of height and a new linear function of dynamic pressure, and if required, for further accuracy, a second preset Mach number may be regarded as requiring a change to a third linear function of dynamic pressure.

There are other ways of generating correct values of $K_3$ at all speeds and altitudes. By the third preferred feature of the invention, instead of computing $K_3$ separately, the feel system itself may be used to perform the computation.

The two alternative manoeuvre boost control systems shown in FIGS. 3 and 4 correspond respectively to the two preferred features of the invention just introduced.

Referring to FIG. 3 a pilot's control stick 1 is connected through a linkage 2 to the power control jack 3. This linkage is also connected to an artificial feel system 6, diagrammatically illustrated by coiled springs. Movement of the control stick 1 will actuate the power control valve 5 and cause the jack to operate the aerodynamic surface 4.

An electrical pick-up member formed by the force transducer 42 is connected to the stick 1 or linkage 2 and feeds through a conductor 43 a signal proportional to the stick force into a function generator 9. A signal denoted $K_4 g$ is fed into the function generator 9 through a conductor 10 from an accelerometer 11. $K_4$ is constant and is chosen so that the steady state signals from the force transducer 42 and the accelerometer 11 are equal when the aircraft centre of gravity is at the design position. A signal denoted $\dot{\theta}$ is also fed into the function generator 9 through a conductor 19 from a rate gyro 21. The symbol $\dot{\theta}$ represents the first derivative of the pitch angle with respect to time.

Height, Mach number and dynamic pressure parameters are fed from the aircraft air data system computer 20 through conductors 15, 16 and 44 respectively and into another function generator 12, from where signals proportional to the factors $K_1$ and $K_3$ are fed through conductors 13 and 45 into the first mentioned function generator 9.

The output signal of the function generator 9 represents $\eta_B + G\dot{\theta}$ and is fed through conductor 17 into an autostabiliser actuator 18 on the power control jack 3. G represents the gain of the autostabiliser system.

The duty of the function generator 12 is to compute two quantities denoted $K_1$ and $K_3$ and provide signals proportional to these quantities from input signals representing altitude, Mach number and dynamic pressure. $K_1$ may be a different function of Mach number according to the range of altitude in which the altitude signal lies. $K_3$ is a continuous function of dynamic pressure, Mach number and height. The duty of the function generator 9 is to compute the signal to be fed to the actuator 18 from the output signals proportional to $K_1$ and $K_3$ and from the $g$ and $\dot{\theta}$ signals supplied by the accelerometer and the rate gyro and also from the stick force signal.

A possible circuit for function generator 12 is shown in FIG. 3.

The computation of $K_1$ involves the components 25 to 29 and 31 to 36 inclusive. The signal proportional to the altitude of the aircraft is fed into the summing amplifier 25. A bias signal is also supplied from the potentiometer 26 to this summing amplifier 25 and the two input signals, being fed through resistors in parallel combine to provide a common input to the amplifier unit proper. In the drawings the unit 25 is depicted by a conventional triangular symbol and the parallel connected resistor shown signifies a feedback. The amplifier output is rectified by a half-wave rectifier 27 and fed to the operating coil 29 of the coil operated contact system 31.

The $K_1$ signal may be one of two alternative functions governed by the altitude and the function of the amplifier 25 is to produce an output signal which alters the setting of the contact system 31 when the altitude exceeds a predetermined level. Thus, in operation, at low altitude where the contacts of the system 31 are in the position shown a selected reference signal is derived from the potentiometer system 32 and passed through an input resistor 33 of a summing amplifier 34 to be there combined with the Mach number signal supplied directly through resistor 36 from the line 16. In the alternative setting of the switch system 31 a different reference signal is supplied from the potentiometer system 32 and fed through the said input resistor 33 of the amplifier 34. Also, with this setting the Mach number signal is fed through a resistor 35 instead of the resistor 36. In this way the output signal representing $K_1$ and supplied by the amplifier 34 is a signal which decreases with increasing Mach number at a rate governed by the magnitude of the appropriate resistor 35 or 36 and having an initial value determined by the reference setting of the potentiometer system 32.

The computation of $K_3$ shown in the circuit diagram corresponds to a feel system whose characteristic is an output which is a function of dynamic pressure up to a fixed Mach number, above which the output remains constant for a given altitude. In this case use of the manoeuvre boost system is assumed to be confined to a limited range of operating altitude, so that no height signal is required. The circuit is shown to comprise a servo motor 46 which sets the slider of potentiometer 47 to provide a signal which is a function of the signal operating the potentiometer servo motor 46. The motor 46 is driven by the dynamic pressure signal supplied along the conductor 44 and accordingly the output $K_3$ from the potentiometer 47 supplied along the conductor 45 will be a function of the dynamic pressure according to the predesigned characteristics of the potentiometer 47.

The Mach number signal supplied along the conductor 16 is fed to a switch 48 in the power supply system 49 of the servo motor 46. The switch 48 is set to operate at a predetermined Mach number so that, at all Mach numbers above the predetermined value, the servo motor 46 and hence the potentiometer 47 are immobilised at the setting obtaining at the instant of operation of the switch 48.

The correct value of $K_3$ will be obtained at any height at Mach numbers below the cut-off value, but change of height at higher Mach numbers will lead to an effective variation of $K_1$ which may be quite large and which could produce an instability in some circumstances. In addition the variation of $G\theta$ required with variation of $K_1$ will not occur, leading to excessive or insufficient damping of longitudinal motion. It should therefore be made impossible to select this simplified system at other than the design altitude.

In an alternative embodiment of the invention instead of computing $K_3$ separately, the feel system itself may be used to perform the computation, for example in the manner shown in FIG. 4. The feel system 60 utilises controlled hydraulic pressure to provide the desired stick stiffness. This feel system may be of the form described in British Patent No. 727,513. A pressure transducer 50 at any convenient position in the controlled hydraulic pressure circuit 51 provides a signal proportional to the inverse of the hydraulic pressure 51, this signal being in fact $K_3$. Function generator 12 is now required only to produce a signal proportional to $K_1$, hence the inputs from air data computer 20 are limited to Mach number and altitude fed through conductors 16 and 15.

The function generator 9 comprises three multiplier units 52, 53 and 54 and two summing amplifiers 55 and 56. The multiplier units 52, 53 and 54 may be of any conventional form suited to the multiplication of analogue quantities and are operative to produce signals proportional to the products $K_1$ and $K_3$, $K_1K_3$ and (S.F.$-K_4g$), and $G\theta$, where G is directly proportional to $K_1$. To generate $\eta_B$, $K_4g$ on line 10 is subtracted from S.F. on line 43 by summing amplifier 55. The product of $K_1$ and $K_3$ from multiplier 52 and the difference signal (S.F.$-K_4g$) from summing amplifier 55 are multiplied by multiplier 53. To generate $G\theta$ a proportion of the signal $K_1$ is multiplied by $\theta$ on line 19 by the multiplier 54. The signals $K_1K_3$ (S.F.$-K_4g$) and $G\theta$ are then added together by summing amplifier 56, which provides the output signal along line 17.

What I claim as my invention and desire to secure by Letters Patent is:

1. An aircraft manoeuvre boost control system for improving the rate of response in pitch of the aircraft to movement of the pilot's control comprising, in combination with tailplane control means including a pilot's control stick, a tailplane power actuator, and a mechanical linkage connecting the control stick and the actuator, an accelerometer positioned in the aircraft to measure acceleration of the aircraft in pitch and to provide an acceleration-responsive electrical signal, electrical transducer means connected to said tailplane control means and operative to provide a signal which is a measure of the force applied to the pilot's control stick by the pilot, electrical computer means connected to respond to the acceleration-responsive signal and to said signal which is a measure of the stick force and operative to produce a boost signal which increases with increase in the signal which is a measure of stick force and decreases with increase of said acceleration-responsive signal, and a connection between said electrical computer means and said power actuator to supply the boost signal to the actuator to supplement the pilot control transmitted along said mechanical control linkage.

2. An aircraft manoeuver boost control system as claimed in claim 1, wherein said boost signal is proportional to the difference between the signal which is a measure of stick force and the acceleration-responsive signal, whereby the boost signal is reduced to zero under steady state conditions.

3. An aircraft manoeuvre boost control system as claimed in claim 1 comprising also an aircraft air data system, and wherein said electrical computer means is also connected to respond to electrical altitude and Mach number signals supplied by the air data system and is operative to decrease the boost signal with increase of Mach number.

4. An aircraft manoeuvre boost control system as claimed in claim 3 wherein the air data system further provides an aircraft dynamic pressure signal and wherein said electrical computer means are further operative to produce a boost signal which varies with variation of the product of the difference between the signal which is a measure of stick force and the acceleration-responsive signal and the product of two gain factors one of which decreases as the Mach number signal increases and the other of which is at least over a range of Mach numbers a linearly increasing function of the dynamic pressure signal.

5. An aircraft manoeuvre boost control system as claimed in claim 1 comprising an artificial feel system including a hydraulic pressure device to provide the control stick stiffness, a pressure-sensitive electrical transducer connected to said hydraulic pressure device to respond to the pressure therein and to provide a signal proportional to the inverse of the hydraulic pressure, and wherein said electrical computer means is connected to said pressure-sensitive transducer and is operative to produce a boost signal which is proportional to the product of the difference between the signal which is a measure of stick force and the acceleration-responsive signal and the product of two gain factors one of which decreases as the Mach number signal increases and the other of which is proportional to the signal derived from the pressure-sensitive transducer.

References Cited in the file of this patent

UNITED STATES PATENTS

| | | |
|---|---|---|
| 2,859,926 | Westbury | Nov. 11, 1958 |
| 2,861,756 | Feucht et al. | Nov. 25, 1958 |
| 2,903,205 | Borngesser et al. | Sept. 8, 1959 |

FOREIGN PATENTS

| | | |
|---|---|---|
| 880,122 | France | Dec. 18, 1942 |